United States Patent
Ehlers et al.

[15] 3,637,346
[45] Jan. 25, 1972

[54] PROCESS FOR THE TRANSFORMATION INTO USEFUL PRODUCTS OF SLUDGES OBTAINED BY NEUTRALIZATION OF CRUDE PHOSPHORIC ACIDS

[72] Inventors: Klaus-Peter Ehlers, Hermulheim near Cologne; Heinz Harnisch, Lovenich near Cologne; Siegfried Lischka, Bruhl-Vochem, all of Germany

[73] Assignee: Knapsack Aktiengesellschaft, Knapsack bei Koln, Germany

[22] Filed: Apr. 22, 1969

[21] Appl. No.: 818,400

[30] Foreign Application Priority Data

May 30, 1968   Germany.....................P 17 67 631.2

[52] U.S. Cl. .................................................23/107, 23/113
[51] Int. Cl. .........................................................C01b 25/30
[58] Field of Search ....................23/106, 107, 110.1, 113; 71/43

[56] References Cited

UNITED STATES PATENTS

| 598,182 | 2/1898 | Poole | 23/107 |
|---|---|---|---|
| 3,035,898 | 5/1962 | Baumann | 23/107 |
| 3,305,304 | 2/1967 | Peterson | 23/107 |

FOREIGN PATENTS OR APPLICATIONS 156   1882   England.................................23/107

Primary Examiner—Earl C. Thomas
Assistant Examiner—Gregory A. Heller
Attorney—Connolly and Hutz

[57] ABSTRACT

Utilization of sludges consisting substantially of insoluble aluminum and iron phosphates, of the type obtained by neutralization of crude phosphoric acids produced from wet-processed phosphate ores. The sludges are combined with silicic acid-containing compounds, which are added in a quantity one or two times the quantity stoichiometrically needed to produce alkali metal aluminum silicates of the general formula $Me_2Al_2SiO_6$, in which Me is an alkali metal, and with an alkali liquor, which is added so as to obtain an alkali metal oxide: $P_2O_5$-molar ratio between 4.0 and 5.0; the resulting suspension is heated to a temperature higher than 90° C., for a period between 30 and 200 minutes, with agitation; phosphoric acid is added so as to produce an alkali metal oxide: $P_2O_5$-molar ratio between 2.5 and 3.5; the $P_2O_5$-concentration in the resulting solution is reduced down to six to 10 weight percent by the addition of water or recycled wash solution; the solution is filtered; an insoluble residue consisting of $Fe(OH)_3$ and $Me_2Al_2SiO_6$ is washed out; and the filtrate is used for making alkali metal phosphates.

10 Claims, No Drawings

PROCESS FOR THE TRANSFORMATION INTO USEFUL PRODUCTS OF SLUDGES OBTAINED BY NEUTRALIZATION OF CRUDE PHOSPHORIC ACIDS

The present invention relates to a process for the transformation into useful products of sludges consisting substantially of insoluble aluminum and iron phosphates, of the type obtained by neutralization of crude phosphoric acids produced from wet-processed phosphate ores.

It is known that the production of alkali metal phosphates from phosphoric acid produced from phosphate ores wet-processed by means of mineral acids, i.e., from so-called wet process phosphoric acid, which is neutralized by means of an alkali liquor to establish a pH value between 4 and 10, entails the formation of sludge, which substantially consists of iron and aluminum phosphates and relatively small proportions of calcium and magnesium phosphates. The sludge which is separated, for example by filtration, from the solution to undergo finishing treatment, has between about 40 and 50 weight percent $P_2O_5$, based on the solid matter content, therein. Needless to say considerable phosphorus would be lost if it were necessary for the sludges to be rejected.

It is known that the treatment with dilute sodium hydroxide solution of aluminum and iron phosphates coming from different sources results in the formation of alkaline sodium phosphate solutions from which trisodium phosphate dodecahydrate commences to crystallize out in more or less good yields, which are a function of the alkali metal content and concentration of the mother liquor. At the same time, sodium aluminate is obtained. This compound can be subjected to silicic acid or sodium silico-fluoride treatment to be transformed into sodium aluminum silicates or sodium aluminum fluorides, which are obtained together with iron hydroxide in the insoluble residue.

These undissolved constituents are very difficult to separate from the phosphate solutions. The suspensions have extremely poor filtration properties because of their high alkalinity. While attempts have already been made in industry to remedy this, sometimes with the use of a great variety of thickeners, the fact remains that the needed sedimentation velocities call for the use of highly dilute matter. This naturally affects the recovery of trisodium phosphate from the filtrate. The subsequent concentration of the solutions would incur considerable extra expenditure with respect to capital and energy, and seriously impair the economy of the process.

It has already been suggested that the above phosphate solutions be clarified by crystallizing the trisodium phosphate, then filtering and washing it out, using the displacement principle. However, this process is not applicable under practical conditions, because of inherent technical difficulties. In addition thereto, in order to obtain commercially satisfactory $P_2O_5$ yields, it would be necessary for the water to be used in quantities as large as those needed for the concentration referred to hereinabove. It is clear therefore that this process provides no real solution to the problem.

It has now unexpectedly been found that the difficulties reported above can be obviated by using the above phosphate sludges in combination with silicic acid-containing compounds, which are added in a quantity one or two times the quantity stoichiometrically needed to produce alkali metal aluminum silicates of the general formula $Me_2Al_2SiO_6$, in which Me is an alkali metal, and in combination with an alkali liquor, which is added so as to obtain an alkali metal oxide: $P_2O_5$-molar ratio between 4.0 and 5.0, and heating the resulting suspension to a temperature higher than 90° C., preferably about 110° C., for a period between 30 and 200 minutes, with agitation. The reaction mixture so produced is mixed with phosphoric acid so as to produce an alkali metal oxide: $P_2O_5$-molar ratio between 2.5 and 3.5, and the $P_2O_5$ concentration in the solution is reduced down to 6 to 10 weight percent, preferably 7 to 9 weight percent, by the addition of water or recycled wash solution. The insoluble residue consisting of $Fe(OH)_3$ and $Me_2Al_2SiO_6$, which is obtained after filtration, is washed out and the filtrate is used for making alkali metal phosphates.

The phosphoric acid to be added to the suspension preferably is impure wet process phosphoric acid, and the silicic acid containing compound preferably is silicic acid or alkali metal silicate, which can be used, for example, in the form of kieselgur or waterglass.

Trialkali metal phosphate is produced from the filtrate by adding thereto an alkali liquor to establish an alkali metal oxide: $P_2O_5$-molar ratio between 3.5 and 4.5 therein, cooling the resulting solution down to a temperature lower than 30° C., preferably 20° C., and separating precipitating trialkali metal phosphate from the mother liquor.

Mother liquor, which remains after separation of the trialkali metal phosphate, can be recycled for use in the wet-processing of phosphate ore.

The trialkali metal phosphate, which preferably remains moist, can be used, if desired in combination with an alkali liquor and/or an alkali metal carbonate, for the neutralization of wet process phosphoric acid.

An alkali liquor with a strength between 20 and 50 weight percent is preferably used in carrying out the process of the present invention.

The advantage offered by the present invention resides in the fact that iron hydroxide-aluminum silicate sludge and phosphate liquor can be directly separated from one another, with high yields of trialkali metal phosphate. 90 to 95 percent of the $P_2O_5$ contained in the sludge is transformed into alkali metal phosphate, with simultaneous complete transformation of the aluminum into insoluble aluminum silicate. The iron and aluminum contaminants in the crude phosphoric acid, which is used to establish an alkali metal oxide: $P_2O_5$-molar ratio between 2.5 and 3.5, are equally obtained in the form of hydroxide or aluminum silicate. This means that a maximum proportion of $P_2O_5$ is available for alkali metal phosphate formation. When the lower limit of alkalinity is exceeded toward the neutral region, then the above phosphates commence to be formed again to an appreciable extent with considerable losses of $P_2O_5$.

The suspensions produced in the manner described above are filtered using a filter press or rotating filter. Good results are obtained in the two cases. To wash the residue, it is generally sufficient to use small amounts of water, which can be circulated to dilute the feed suspension, as already mentioned above. After having been washed, the residue contains between 13 and 15 weight percent $P_2O_5$, corresponding to a yield loss of 14 percent, based on the quantity initially contained in the feed sludge.

As to the filtrate, it is first necessary for it to be treated with an alkali liquor to shift the alkali metal oxide: $P_2O_5$-molar ratio toward the alkaline region. This is done to reduce the solubility of the alkali metal phosphate, which is greatly determined by the alkalinity of the mother liquor. For the specified concentration range between 7 and 9 weight percent $P_2O_5$, the limit at which maximum salt separation occurs is defined by a molar ratio of about 4:1, when the solution is cooled down to about 20°–25° C.

After separation of the salt, preferably by means of a centrifuge, the mother liquor generally contains about 1 weight percent $P_2O_5$. Trialkali metal phosphate is accordingly obtained in a yield of 77 weight percent $P_2O_5$, which can be increased further when the process is carried out in close contact with wet process phosphoric acid product and the mother liquor is recycled to the sulfuric acid processing stage. This also enables the balance portions of $P_2O_5$ and alkali metal oxide in the mother liquor to be utilized, and the losses of material to be restricted to the components present in the separated iron-hydroxide-aluminum silicate sludge.

Such combination with wet process phosphoric acid production simultaneously dictates strict control of the water needed in the process. Failing this, it would be necessary for mother liquor having too high a content of water therein to be concentrated prior to recycling it to the reactor of the wet-processing stage. The concentration range between 7 and 9 weight percent $P_2O_5$ to be selected for dilution of the feed suspension under the conditions specified simultaneously is the critical concentration up to which unconcentrated mother liquor can be recycled to the wet process phosphoric acid production stage.

EXAMPLE

Eight hundred and twenty-six kilograms sludge containing 256 kg. $P_2O_5$ and 314 kg. water, of the type obtained by neutralization of wet process phosphoric acid, were combined with 884 kg. sodium hydroxide solution with a strength of 50 weight percent and 44 kg. kieselgur or the corresponding quantity of waterglass, and the mixture was heated to 110° C., for 2 hours, with agitation. The mixture was allowed to cool down to about 80° C. and gradually combined then with 360 kg. phosphoric acid, which had strength of 28 weight percent and was free from sulfate and silicate ions, and 2,500 kg. water. The whole was filtered using a filter press. A colorless filtrate was obtained. It contained 8.2 weight percent $P_2O_5$ and 9.92 weight percent $Na_2O$, corresponding to a molar ratio of 2.77:1. The molar ratio was increased to 4:1 by the addition of 420 kg. sodium hydroxide solution with a strength of 50 weight percent, and the whole was cooled down to 22° to 25° C. Sodium phosphate in the form of $Na_3PO_4 \cdot 12 H_2O \cdot \frac{1}{4} NaOH$ commenced to crystallize out. Moist salt was obtained in a yield of 1762 kg.; this corresponded to 1350 kg. air-dried material containing 297 kg. $P_2O_5$, or to a total yield of 77 weight percent. The iron hydroxide residue contained 36 kg. $P_2O_5$, corresponding to 14 weight percent in the dry substance. This corresponded to a loss of 14 weight percent, based on the sludge. The balance portion, namely 23 kg. $P_2O_5$ or 9.0 weight percent, was in the mother liquor.

We claim:

1. In the process for the transformation into alkali metal phosphates of sludges consisting substantially of insoluble aluminum and iron phosphates which are obtained by neutralization of crude wet process phosphoric acid, which process involves admixing said sludges with silicic acid or an alkali metal silicate and with an alkali metal hydroxide, heating the mixture obtained, slurrying the heat-treated material, separating the phosphate solution produced from the solids and isolating alkali metal phosphates from the said phosphate solution, the improvement which comprises admixing the said sludges with a silicic acid-containing compound selected from the group consisting of silicic acid and an alkali metal silicate in a quantity one to two times the quantity stoichiometrically needed to produce alkali metal aluminum silicates of the general formula $Me_2Al_2SiO_6$, in which Me is an alkali metal, and with the alkali metal hydroxide so as to obtain an alkali metal oxide: $P_2O_5$-molar ratio between 4.0 and 5.0; heating the resulting suspension to a temperature of preferably about 110° C., for a period between 30 and 200 minutes, with agitation; adding thereafter to the reaction mixture obtained phosphoric acid so as to produce an alkali metal oxide: $P_2O_5$-molar ratio between 2.5 and 3.5; reducing the $P_2O_5$ concentration in the resulting solution down to 6 to 10 weight percent by addition of water or recycled wash solution, filtering the suspension obtained; washing out an insoluble residue consisting of $Fe(OH)_3$ and $Me_2Al_2SiO_6$ and suitably recovering alkali metal phosphates from the filtrate.

2. The process of claim 1, wherein the phosphoric acid added to the suspension is impure wet process phosphoric acid.

3. The process of claim 1 wherein the said silicic acid-containing compound consists of kieselgur or waterglass.

4. The process of claim 1, wherein an alkali metal hydroxide is added to the filtrate to establish an alkali metal oxide: $P_2O_5$-molar ratio between 3.5 and 4.5 therein, the resulting solution is cooled down to a temperature lower than 30° C., and trialkali metal phosphate which precipitates is separated from the mother liquor.

5. The process of claim 4, wherein mother liquor which remains after separation of the trialkali metal phosphate is recycled for wet-processing of phosphate ore.

6. The process of claim 4, wherein the trialkali metal phosphate is used for neutralizing wet process phosphoric acid.

7. The process of claim 1, wherein the alkali metal hydroxide used has a strength between 20 and 50 weight percent.

8. The process of claim 1, wherein phosphoric acid is added to establish an alkali metal oxide: $P_2O_5$-molar ratio between 2.5 and 3.5 and water or recycled wash solution is added to the resulting solution to establish a $P_2O_5$ concentration between 7 and 9 weight percent therein.

9. The process of claim 4, wherein the solution is cooled down to 20° C. and the trialkali metal phosphate is then separated from the mother liquor.

10. The process of claim 6, wherein the trialkali metal phosphate is used in combination with at least one substance selected from the group consisting of alkali metal hydroxide and alkali metal carbonate for the neutralization of wet process phosphoric acid.

* * * * *